(12) United States Patent
Yang

(10) Patent No.: US 9,762,684 B2
(45) Date of Patent: Sep. 12, 2017

(54) METHOD AND APPARATUS FOR IMPLEMENTING ACTION INSTRUCTION BASED ON BARCODE

(71) Applicant: Tencent Technology (Shenzhen) Company Limited, Shenzhen (CN)

(72) Inventor: Maowei Yang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 26 days.

(21) Appl. No.: 14/567,961

(22) Filed: Dec. 11, 2014

(65) Prior Publication Data

US 2015/0090781 A1   Apr. 2, 2015

Related U.S. Application Data

(63) Continuation of application No. PCT/CN2014/082376, filed on Jul. 17, 2014.

(30) Foreign Application Priority Data

Sep. 25, 2013 (CN) .......................... 2013 1 0443145

(51) Int. Cl.
    *G06K 19/06* (2006.01)
    *H04L 29/08* (2006.01)
    *H04L 29/06* (2006.01)

(52) U.S. Cl.
    CPC .............. *H04L 67/18* (2013.01); *H04L 69/08* (2013.01); *G06K 19/06028* (2013.01); *G06K 19/06037* (2013.01); *H04L 67/02* (2013.01)

(58) Field of Classification Search
    CPC ................................................ G06K 19/06028
    See application file for complete search history.

(56) References Cited

U.S. PATENT DOCUMENTS 5,933,829 A * 8/1999 Durst ................ G06F 17/30879
6,467,686 B1 * 10/2002 Guthrie .................. G06Q 30/02
                                                    235/375

(Continued)

FOREIGN PATENT DOCUMENTS

CN      101132293 A      2/2008
CN      202512587 U      10/2012

(Continued)

OTHER PUBLICATIONS

Tencent Technology, IPRP, PCT/CN2014/082376, Mar. 29, 2016, 5 pgs.

(Continued)

*Primary Examiner* — Christopher Stanford
(74) *Attorney, Agent, or Firm* — Morgan, Lewis & Bockius LLP

(57) ABSTRACT

An electronic device for processing barcode information is described. The device includes one or more processors; and memory storing one or more programs. The device receives barcode information. The barcode information includes (1) information identifying an action instruction and (2) information identifying a first location of a corresponding barcode. The device performs an action in accordance with the action instruction and the first location of the corresponding barcode. A corresponding method and a computer readable storage medium storing one or more programs for execution by the electronic device are also described.

16 Claims, 7 Drawing Sheets

(56) References Cited

U.S. PATENT DOCUMENTS

| | | | | |
|---|---|---|---|---|
| 2011/0270667 A1* | 11/2011 | Kenny | ............... | G06Q 30/0236 705/14.36 |
| 2012/0091202 A1* | 4/2012 | Cohen | ..................... | G06F 21/33 235/382 |
| 2012/0308003 A1* | 12/2012 | Mukherjee | ..................... | 380/243 |
| 2014/0110468 A1* | 4/2014 | Kandregula | .................. | 235/375 |
| 2015/0041530 A1* | 2/2015 | Burkhart et al. | ............. | 235/375 |

FOREIGN PATENT DOCUMENTS

| | | | |
|---|---|---|---|
| CN | 102833353 A | 12/2012 |
| CN | 102855323 A | 1/2013 |
| CN | 102929595 A | 2/2013 |
| CN | 103067381 A | 4/2013 |

OTHER PUBLICATIONS

Tencent Technology, ISRWO, PCT/CN2014/082376, Oct. 21, 2014, 7 pgs.

* cited by examiner

1000

1002 Prior to receiving barcode information, receive protocol data from a third-party terminal. The protocol data includes (1) information identifying an action instruction and (2) information identifying a first location of a corresponding barcode. Generate a barcode that stores (1) the information identifying the action instruction and (2) the information identifying the first location. Send the barcode to the third-party terminal.

1004 Prior to generating the barcode: send a unique code to the third-party terminal and receive the unique code from the third-party terminal 1006 The protocol data includes information identifying a second location. Generate a second barcode that stores (1) the information identifying action instruction and (2) the information identifying the second location. Send the second barcode to the third-party terminal.

1008 Receive barcode information. The barcode information includes (1) the information identifying the action instruction and (2) the information identifying the first location of the corresponding barcode.

1010 The barcode information includes information identifying an expiration time. Prior to performing the action in accordance with the action instruction and the first location of the corresponding barcode, determine that the expiration time has not passed.

1012 Perform an action in accordance with the action instruction and the first location of the corresponding barcode 1014 Performing the action in accordance with the action instruction and the first location of the corresponding barcode includes presenting webpage information that corresponds to the action instruction and the first location 1016 Store a number of barcode scans from the first location based on a number of receiving the barcode information that includes information identifying the first location

FIG. 10

METHOD AND APPARATUS FOR IMPLEMENTING ACTION INSTRUCTION BASED ON BARCODE

RELATED APPLICATIONS

This application is a continuation application of PCT Patent Application No. PCT/CN2014/082376, entitled "METHOD AND APPARATUS FOR IMPLEMENTING ACTION INSTRUCTION BASED ON BARCODE" filed on Jul. 17, 2014, which claims priority to Chinese Patent Application Serial No. 201310443145.4, entitled "METHOD AND APPARATUS FOR IMPLEMENTING ACTION INSTRUCTION BASED ON BARCODE," filed on Sep. 25, 2013, both of which are incorporated by reference herein in their entirety.

TECHNICAL FIELD

This application relates to the field of network technologies, and in particular, to a method and an apparatus for implementing an action instruction based on a barcode.

BACKGROUND

One-dimensional barcodes and two-dimensional barcodes are commonly used. Since barcodes have certain properties, such as having a certain data capacity, low space utilization rate, and low cost, barcodes are widely applied to forms, security and confidentiality, certificates, and material backup for protection.

Barcodes can be printed on a newspaper, a magazine, a book, a package, and a personal business card, and also can appear in a form of an electronic image in various network applications. A technology that applies the barcode to a mobile terminal already exists, where the barcode is scanned by using a photographing function of the mobile terminal to quickly obtain information stored in the barcode, so as to access a network, send a short message, dial a number, exchange material, automatically input words, and the like.

However, the inventor finds that the prior art has at least the following technical problems.

In a conventional method for implementing an action instruction based on a barcode, the barcode is automatically generated by a system. In addition, for a same network account, only one barcode is generated, for example, for some public accounts, each public account corresponds to a unique barcode, and a user can execute a corresponding action instruction (for example, adding the public account) by using a mobile terminal to scan a corresponding barcode. Therefore, in the conventional method, a developer cannot control content of the barcode, which is a disadvantage.

SUMMARY

In view of the above, it is necessary to provide a method and an apparatus for implementing an action instruction based on a barcode, where the method and the apparatus can be controlled by a developer and are more flexible.

In accordance with some embodiments, a method for processing barcode information is performed by an electronic device with memory and one or more processors. The method includes receiving barcode information, the barcode information including (1) information identifying an action instruction and (2) information identifying a first location of a corresponding barcode. The method also includes performing an action in accordance with the action instruction and the first location of the corresponding barcode.

In accordance with some embodiments, an electronic device for processing barcode information includes one or more processors; and memory storing one or more programs for execution by the one or more processors. The one or more programs include instructions for receiving barcode information, the barcode information including (1) information identifying an action instruction and (2) information identifying a first location of a corresponding barcode. The one or more programs also include instructions for performing an action in accordance with the action instruction and the first location of the corresponding barcode.

In accordance with some embodiments, a non-transitory computer readable storage medium stores one or more programs for execution by one or more processors of a portable electronic device. The one or more programs include instructions for receiving barcode information, the barcode information including (1) information identifying an action instruction and (2) information identifying a first location of a corresponding barcode. The one or more programs also include instructions for performing an action in accordance with the action instruction and the first location of the corresponding barcode.

In accordance with some embodiments, a method for implementing an action instruction based on a barcode includes the following steps: receiving protocol data submitted by a third-party terminal, where the protocol data includes an action instruction identification and parameter data corresponding to the action instruction identification; generating a barcode according to the protocol data; and receiving the protocol data that is sent by a user terminal and obtained by scanning the barcode; and executing a corresponding action instruction according to the action instruction identification and the parameter data in the protocol data.

In accordance with some embodiments, an apparatus for implementing an action instruction based on a barcode includes: a first protocol data receiving module, configured to receive protocol data submitted by a third-party terminal, where the protocol data includes an action instruction identification and parameter data corresponding to the action instruction identification; a barcode generating module, configured to generate a barcode according to the protocol data; a second protocol data receiving module, configured to receive the protocol data that is sent by a user terminal and obtained by scanning the barcode; and an action executing module, configured to execute a corresponding action instruction according to the action instruction identification and the parameter data in the protocol data.

In the method and apparatus for implementing an action instruction based on a barcode, protocol data submitted by a third-party terminal is received. A barcode is generated according to the protocol data. A corresponding action instruction can be executed when the protocol data obtained by a user terminal by scanning the barcode is received. Because the protocol data is submitted by the third-party terminal, a third party can specify an action instruction identification and corresponding parameter data by submitting the protocol data. In this way, a developer can control content of a barcode corresponding to the same network account, which is more flexible.

BRIEF DESCRIPTION OF THE DRAWINGS

The aforementioned features and advantages as well as additional features and advantages thereof will be more clearly understood hereinafter as a result of a detailed description of preferred embodiments when taken in conjunction with the drawings.

FIG. 10 illustrates a flow chart of an exemplary method for processing barcode information in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages more comprehensible, various embodiments are described in further detail below with reference to accompany drawings. It should be understood that, the specific embodiments described herein are merely used to explain various principles, but are not intended to limit the scope of claims.

Figure 1:
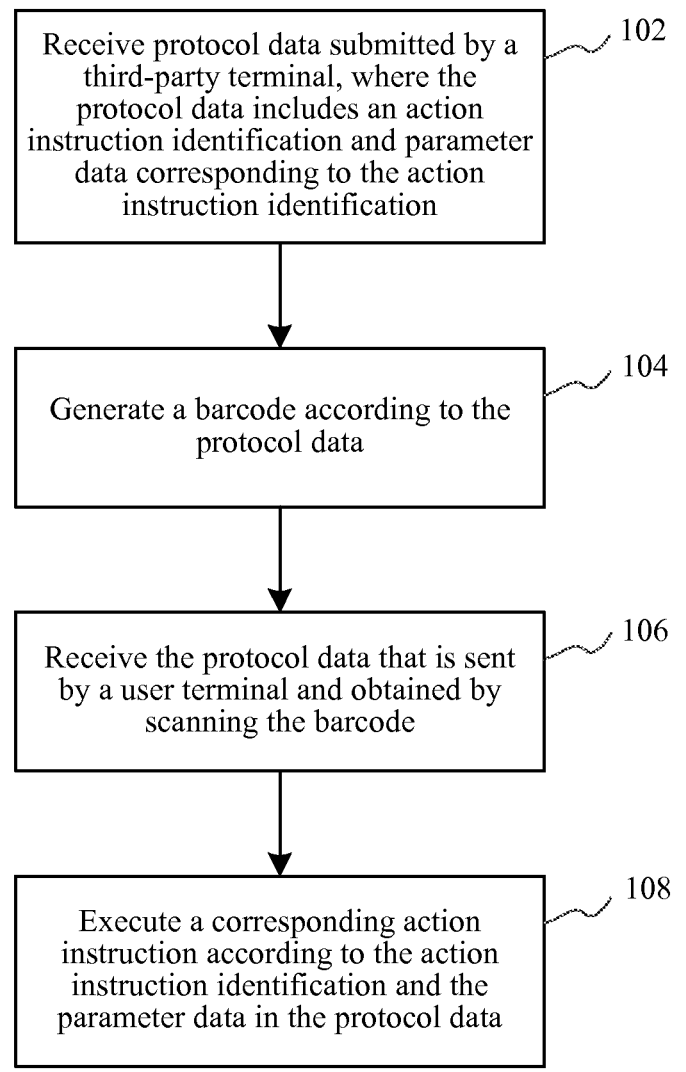
FIG. 1 is a schematic flowchart of a method for implementing an action instruction based on a barcode according to some embodiments.

FIG. 1 is a schematic flowchart of a method for implementing an action instruction based on a barcode according to some embodiments. The method includes the following:

Step 102: Receive protocol data submitted by a third-party terminal, where the protocol data includes an action instruction identification and parameter data corresponding to the action instruction identification.

The third-party terminal may be a terminal of a developer, the protocol data may be protocol data input by the developer by using the third-party terminal, the protocol data may include the action instruction identification and the parameter data corresponding to the action instruction identification, where the parameter data may be a parameter defined by the developer. In some embodiments, the third-party terminal may obtain the protocol data input by the developer and submit the protocol data to a server, and the server receives the protocol data submitted by the third-party terminal.

Step 104: Generate a barcode according to the protocol data. The barcode may be generated according to the protocol data by using a conventional barcode generating technology, and the barcode includes a one-dimensional barcode and a two-dimensional barcode, and is not limited to a barcode in a specified form.

Further, the generated barcode may be in a form of an electronic picture, and may also be printed on entities, such as a newspaper, a magazine, a book, and an advertisement.

Step 106: Receive the protocol data that is sent by a user terminal and obtained by scanning the barcode. The user terminal may be any terminal that installs a barcode scanning tool, and includes, but is not limited to, various desktop computers, laptop portable computers, personal digital assistants, tablet computers, smart phones, electronic book readers, Moving Picture Experts Group Audio Layer III (MP3) or Moving Picture Experts Group Audio Layer IV (MP4) players, POS terminals, and in-vehicle computers.

In some embodiments, picture information of the barcode may be collected by using a picture collecting tool on the user terminal, the collected barcode is scanned by using a client, so as to obtain barcode information, where the barcode information is the protocol data. After the user terminal scans the barcode, the obtained protocol data is triggered to be sent to the server, and the server receives the protocol data sent by the user terminal.

Step 108: Execute a corresponding action instruction according to the action instruction identification and the parameter data in the protocol data.

Specifically, the corresponding action instruction may be executed according to the action instruction identification in the protocol data. Certain interface content may be displayed to the user terminal according to the parameter data, or some data self-defined by the developer is counted. In some embodiments, since the protocol data is submitted by the third-party terminal, the developer can define content of the protocol data, and the developer can control content of the barcode flexibly.

Figure 2:
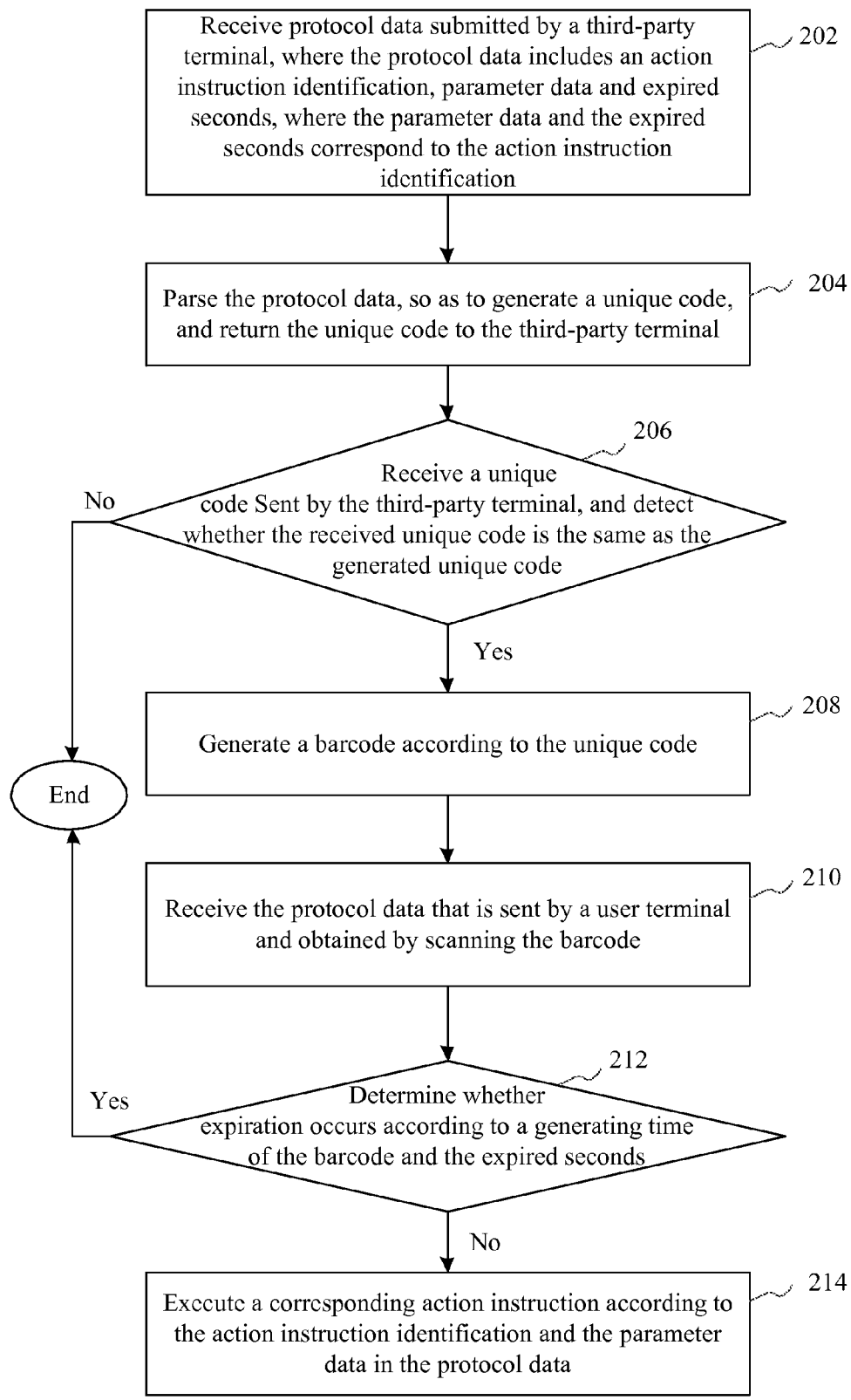
FIG. 2 is a schematic flowchart of a method for implementing an action instruction based on a barcode according to some embodiments.

FIG. 2 is a schematic flowchart of a method for implementing an action instruction based on a barcode according to some embodiments. The method includes the following:

Step 202: Receive protocol data submitted by a third-party terminal, where the protocol data includes an action instruction identification, parameter data, and expired seconds, where the parameter data and the expired seconds correspond to the action instruction identification.

The protocol data may be protocol data input by a developer by using the third-party terminal, and the developer may specify, in the protocol data, the action instruction identification, the corresponding parameter data and expired seconds, where the action instruction identification may be a name of an action instruction. In some embodiments, the protocol data may be structured data, for example, data of a UInt32 structure (indicating a 32-bit unsigned integer).

In some embodiments, the protocol data may be structured data in the following format.

```
{
    "expire_seconds": N,
    "action_name": "name"
    "action_info": {real_acion_info}
}
```

The expire_seconds indicate expired seconds, the action_name indicates a name of an action instruction, the action_info indicates corresponding parameter data, and the real_acion_info is a specific parameter. It should be noted that the foregoing structured data only shows protocol data in some embodiments, and it should be understood that the developer can define the parameter data at will according to a demand and can modify specific content in the parameter data.

Step 204: Parse the protocol data, so as to generate a unique code, and return the unique code to the third-party terminal.

Specifically, the received protocol data may be parsed, so as to generate the unique barcode, where the barcode is unique. In addition, the received protocol data may be stored.

Step 206: Receive a unique code sent by the third-party terminal, detect whether the received unique code is the same as the generated unique code; and if yes, execute step 208; otherwise end the operation.

Step 208: Generate a barcode according to the unique code. In some embodiments, if the received unique code sent by the third-party terminal is the same as the generated unique code, it is indicated that the verification is passed, and the barcode is generated according to the unique code; otherwise, the verification is not passed. By returning the generated unique code to the third-party terminal and detecting according to the received unique code sent by the third-party terminal, legality of the third-party terminal may be detected, that is, legality of the third-party terminal that submits the protocol data may be verified, thereby improving security.

Step 210: Receive the protocol data that is sent by a user terminal and obtained by scanning the barcode. Picture information of the barcode is collected by using a picture collecting tool on the user terminal; the collected barcode is scanned by using a client, so as to obtain barcode information, where the barcode information is the protocol data. After the user terminal scans the barcode, the protocol data is triggered to be sent to a server, and the server receives the protocol data obtained by the user terminal by scanning the barcode.

Step 212: Determine whether expiration occurs according to a generating time of the barcode and the expired seconds; if no expiration occurs, execute step 214; otherwise, end the operation.

For some barcodes, there may be timeliness, for example, a barcode used for client login. The developer may define corresponding expired seconds in the protocol data. When the barcode is generated, the generating time of the barcode may be recorded and timing is started. When receiving the protocol data obtained by the user terminal by scanning the barcode, the expired seconds in the protocol data can be obtained. It is determined according to the expired seconds whether expiration occurs. If no expiration occurs, verification is passed; otherwise, the verification is not passed.

Step 214: Execute a corresponding action instruction according to the action instruction identification and the parameter data in the protocol data.

In some embodiments, the corresponding action instruction may be executed according to a name of an action instruction in the protocol data, for example, the action instruction is adding a public account, and then, after receiving the protocol data sent by the user terminal, the public account is added into an adding list corresponding to user identification. Further, the parameter data in the protocol data may further be obtained and corresponding processing is performed according to the parameter data, for example, recording a self-defined character string in the parameter data, jumping to a website in the parameter data, and displaying a thumbnail defined in the parameter data to the user terminal.

In some embodiments, the parameter data includes a website specified by a third party, and the step 214 includes: Jump to the website specified by the third party, display corresponding interface content to the user terminal according to the website specified by the third party, receive a triggering instruction sent by the user terminal, and execute the corresponding action instruction according to the triggering instruction and the action instruction identification.

In some embodiments, after the protocol data sent by the user terminal is obtained, the website specified by the third party may be obtained and legality of the website is verified; if legal, the website specified by the third party is jumped into and the corresponding interface content is displayed to the user terminal according to the website specified by the third party, for example, displaying a title, a thumbnail, text content, and a control. Further, after a user triggers a corresponding control, the user terminal can obtain the triggering instruction and sends the triggering instruction to a server. The server receives the triggering instruction sent by the user terminal, and then executes the action instruction corresponding to the action instruction identification.

In some embodiments, the parameter data includes a self-defined character string, and the step of executing a corresponding action instruction according to the action instruction identification and the parameter data in the protocol data includes: obtaining the self-defined character string and performing parameter counting according to the self-defined character string.

In these embodiments, since the developer can define specific content of the parameter data, various parameters can be counted by using the barcode, for example, counting a user type, a user source, and the like. The user source is used as an example for description. The parameter data includes a self-defined character string that indicates a source, for example, "action from" is used for indicating a source. The parameter data includes various "action from", for example, content of "action from" in parameter data in an airport barcode is "airport", and content of "action from" in parameter data in a railway station barcode is "railway station". After the protocol data sent by the user terminal is received, the self-defined character string, in the protocol data and used for indicating a source, can be obtained, so as to count a source of the protocol data.

A specific application scenario is used for describing a principle of the method for implementing an action instruction based on a barcode in the foregoing embodiments. In the application scenario, the method being applied to a network application is used as an example, where the network application includes, but is not limited to, various instant messaging applications, game applications, social applications, and the like.

Figure 3:
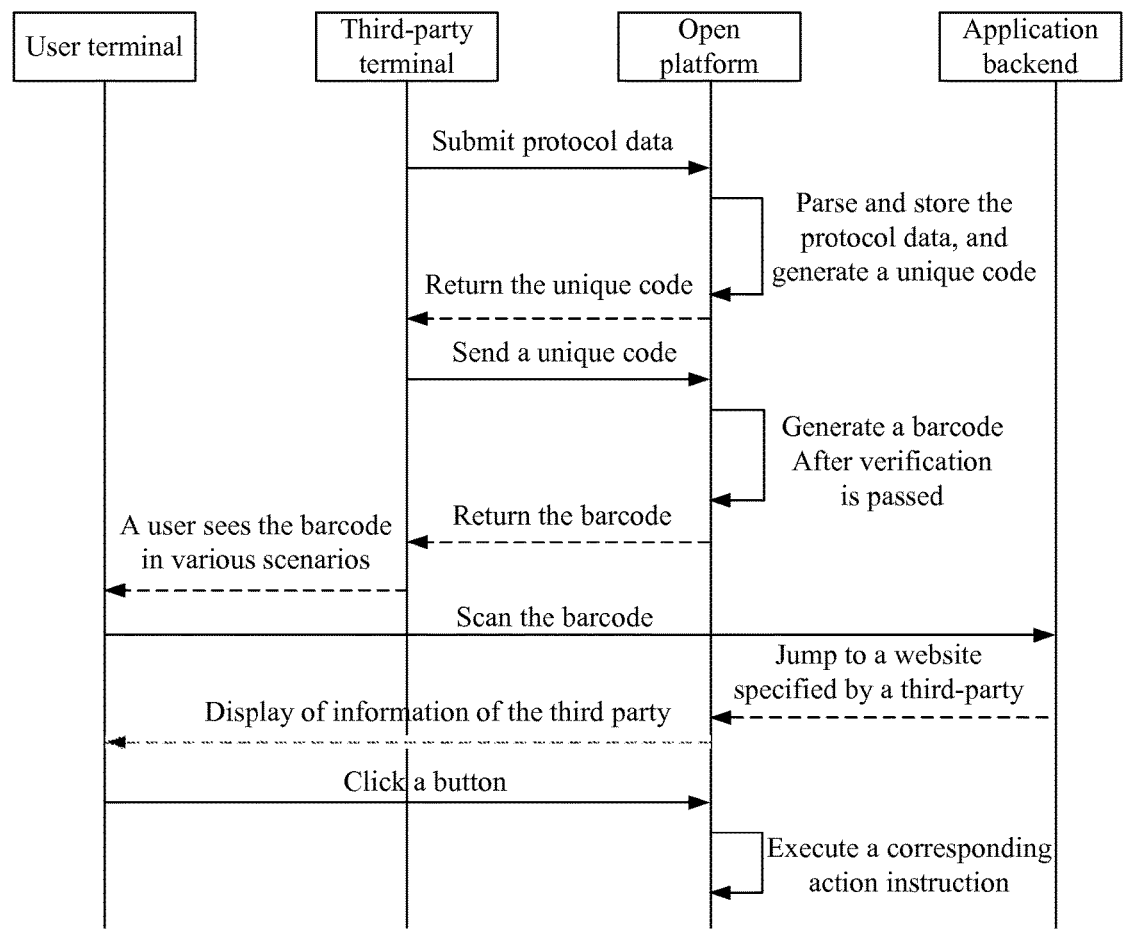
FIG. 3 is an application scenario diagram of a method for implementing an action instruction based on a barcode according to some embodiments.

FIG. 3 is an application scenario diagram of a method for implementing an action instruction based on a barcode according to some embodiments. As shown in FIG. 3, in this application scenario, the server includes an application backend and an open platform open to developers, where the open platform is maintained by the application backend. Specifically, the method for implementing an action instruction based on a barcode in this scenario includes the following steps:

(1) A third-party terminal submits protocol data to the open platform; and the open platform parses and stores the protocol data, generates a unique code according to the protocol data, and sends the unique code to the third-party terminal.

For example, a format of the protocol data received by the open platform and submitted by the third-party terminal is as follows:

```
{
   "action_name": "time_line" "action_info": {
   "time_line_info": {
      "title": "comment on famous car: temptation of space and
      configuration
      Luxgen 5 Sedan", "click_url": "http://www.cad.com.cn/viewpoint-
      20130628-42401.shtml", "pic_url":
      http://images.cad.com.cn/2013/0628/1372402202518.jpg",
      }
   }
}
```

The time_line indicates a name of an action instruction, the title, the click_url, and the pic_url indicate parameter data corresponding to the action instruction time_line, where the title is a title, the click_url is a website specified by a third party, namely, a website that should be jumped into after the action instruction is executed, and the pic_url is a thumbnail link, where according to the thumbnail link, the website specified by the third party may be jumped into, so as to display a corresponding thumbnail.

(2) After receiving the unique code, the third-party terminal sends a unique code to the open platform; the open platform receives the unique code sent by the third-party terminal and detects whether the unique code is the same as the generated unique code; if same, verification is passed, and a barcode is generated according to the unique code, where the barcode is preferably a two-dimensional barcode. The open platform may return the generated barcode to the third-party terminal, so that the third-party terminal learns that the barcode is generated.

(3) The generated barcode is in various scenarios, for example, the barcode may be uploaded to the Internet in a form of an electronic picture, and the barcode may also be printed on a newspaper, a magazine, a book, and an advertisement, for example, printed on an advertisement in an airport.

(4) The user can see the barcode in various scenarios and scans the barcode by using the user terminal; the user terminal obtains barcode information after scanning the barcode, namely, the protocol data; and uploads the protocol data to the application backend; the application backend obtains an action instruction identification and corresponding parameter data in the protocol data; if the parameter data includes the website specified by the third-party, verifies legality of the website; jumps to the website specified by the third-party after verification is passed; and displays corresponding interface content to the user terminal, including the title and the thumbnail.

(5) After the user triggers all controls (for example, clicking a button) of the interface content, the user terminal can obtain a triggering instruction and sends the triggering instruction to the open platform; and the open platform may execute a corresponding action instruction according to the action instruction identification after receiving the triggering instruction.

Figure 4:
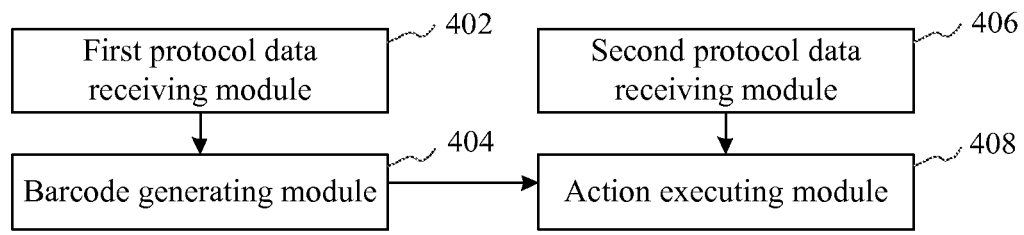
FIG. 4 is a structural block diagram of an apparatus for implementing an action instruction based on a barcode according to some embodiments.

FIG. 4 is a structural block diagram of an apparatus for implementing an action instruction based on a barcode according to some embodiments. In FIG. 4, the apparatus for implementing an action instruction based on a barcode includes the following.

A first protocol data receiving module 402, configured to receive protocol data submitted by a third-party terminal, where the protocol data includes an action instruction identification and parameter data corresponding to the action instruction identification.

The third-party terminal may be a terminal of a developer, the protocol data may be protocol data input by the developer by using the third-party terminal, the protocol data may include the action instruction identification and the parameter data corresponding to the action instruction identification, where the parameter data may be a parameter defined by the developer.

A barcode generating module 404, configured to generate a barcode according to the protocol data, where the barcode generating module 404 may generate the barcode according to the protocol data by using a conventional barcode generating technology, and the barcode includes a one-dimensional barcode and a two-dimensional barcode, and is not limited to a barcode in a specified form. Further, the generated barcode may be in a form of an electronic picture, and may also be printed on entities, such as a newspaper, a magazine, a book, and an advertisement.

A second protocol data receiving module 406, configured to receive the protocol data that is sent by a user terminal and obtained by scanning the barcode.

An action executing module 408, configured to execute a corresponding action instruction according to the action instruction identification and the parameter data in the protocol data.

In some embodiments, the action executing module 408 may be configured to execute the corresponding action instruction according to the action instruction identification in the protocol data, may display certain interface content to the user terminal according to the parameter data, or counts some data self-defined by the developer.

Figure 5:
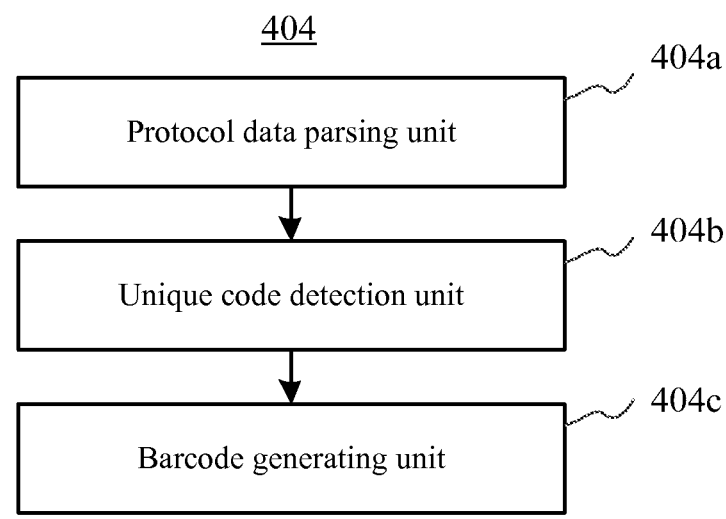
FIG. 5 is a structural block diagram of a barcode generating module according to some embodiments.

FIG. 5 is a structural block diagram of a barcode generating module according to some embodiments. In FIG. 5, the barcode generating module 404 includes the following.

A protocol data parsing unit 404a, configured to parse the protocol data to generate a unique code and return the unique code to the third-party terminal.

A unique code detection unit 404b, configured to receive a unique code sent by the third-party terminal and detect whether the received unique code is the same as the generated unique code.

A barcode generating unit 404c, configured to: when it is detected that the received unique code is the same as the generated unique code, generate the barcode according to the unique code.

In some embodiments, the protocol data further includes expired seconds.

Figure 6:
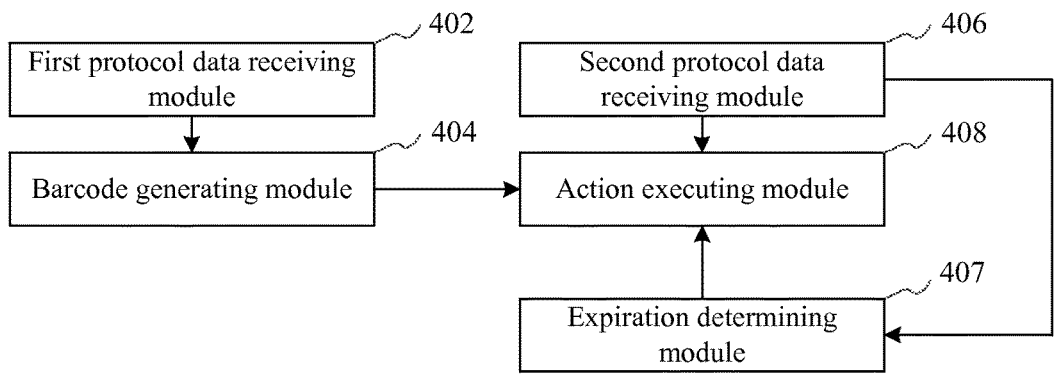
FIG. 6 is a structural block diagram of an apparatus for implementing an action instruction based on a barcode according to some embodiments.

FIG. 6 is a structural block diagram of an apparatus for implementing an action instruction based on a barcode according to some embodiments. In FIG. 6, the apparatus for implementing an action instruction based on a barcode includes components described above with respect to FIG. 4, which are not repeated for brevity. The apparatus shown in FIG. 6 also includes the following.

An expiration determining module 407, configured to determine whether expiration occurs according to a generating time of the barcode and the expired seconds. In some embodiments, the action executing module 408 is further configured to: if no expiration occurs, execute the corresponding action instruction according to the action instruction identification and the parameter data in the protocol data. For some barcodes, there may be timeliness, for example, a barcode used for client login. The developer may define corresponding expired seconds in the protocol data. When the barcode generating unit 404c generates the barcode, the generating time of the barcode may be recorded and timing is started. When the protocol data obtained by the user terminal by scanning the barcode is received, the expiration determining module 407 may be configured to obtain the expired seconds in the protocol data. It is determined according to the expired seconds whether expiration occurs. If no expiration occurs, verification is passed; otherwise, the verification is not passed.

In some embodiments, the parameter data includes a website specified by a third-party.

Figure 7:
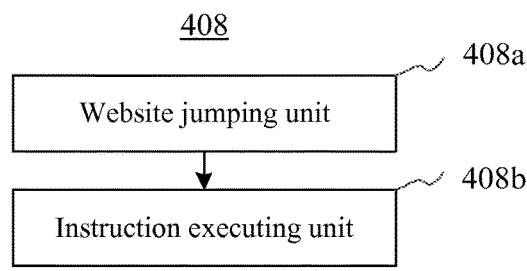
FIG. 7 is a structural block diagram of an action executing module according to some embodiments.

FIG. 7 is a structural block diagram of an action executing module according to some embodiments. As shown in FIG. 7, the action executing module 408 includes a website jumping unit 408a, configured to jump to the website specified by the third-party and display corresponding interface content according to the website specified by the third-party.

In some embodiments, the website jumping unit 408a is further configured to verify legality of the website specified by the third-party; and if legal, jump to the website specified by the third-party.

In some embodiments, the action executing module 408 also includes an instruction executing unit 408b, configured to receive a triggering instruction sent by the user terminal and execute the corresponding action instruction according to the triggering instruction and the action instruction identification.

In some embodiments, the parameter data includes a self-defined character string.

Figure 8:
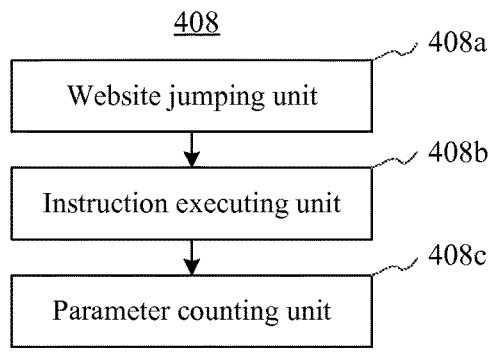
FIG. 8 is a structural block diagram of an action executing module according to some embodiments.

FIG. 8 is a structural block diagram of an action executing module according to some embodiments. In FIG. 8, the action executing module 408 further includes a parameter counting unit 408c, configured to obtain the self-defined character string and perform parameter counting according to the self-defined character string.

In the method and apparatus for implementing an action instruction based on a barcode, since what is received is protocol data submitted by a third-party terminal, a developer can self-define content of the protocol data; and therefore, content of a barcode corresponding to a network account can be flexibly controlled. In addition, a same network account can correspond to different barcodes by defining for the same network account different parameter data in the protocol data, so that a conventional manner that one network account can only correspond to one unique barcode is changed and data counting can be performed more flexibly and conveniently.

Figure 9:
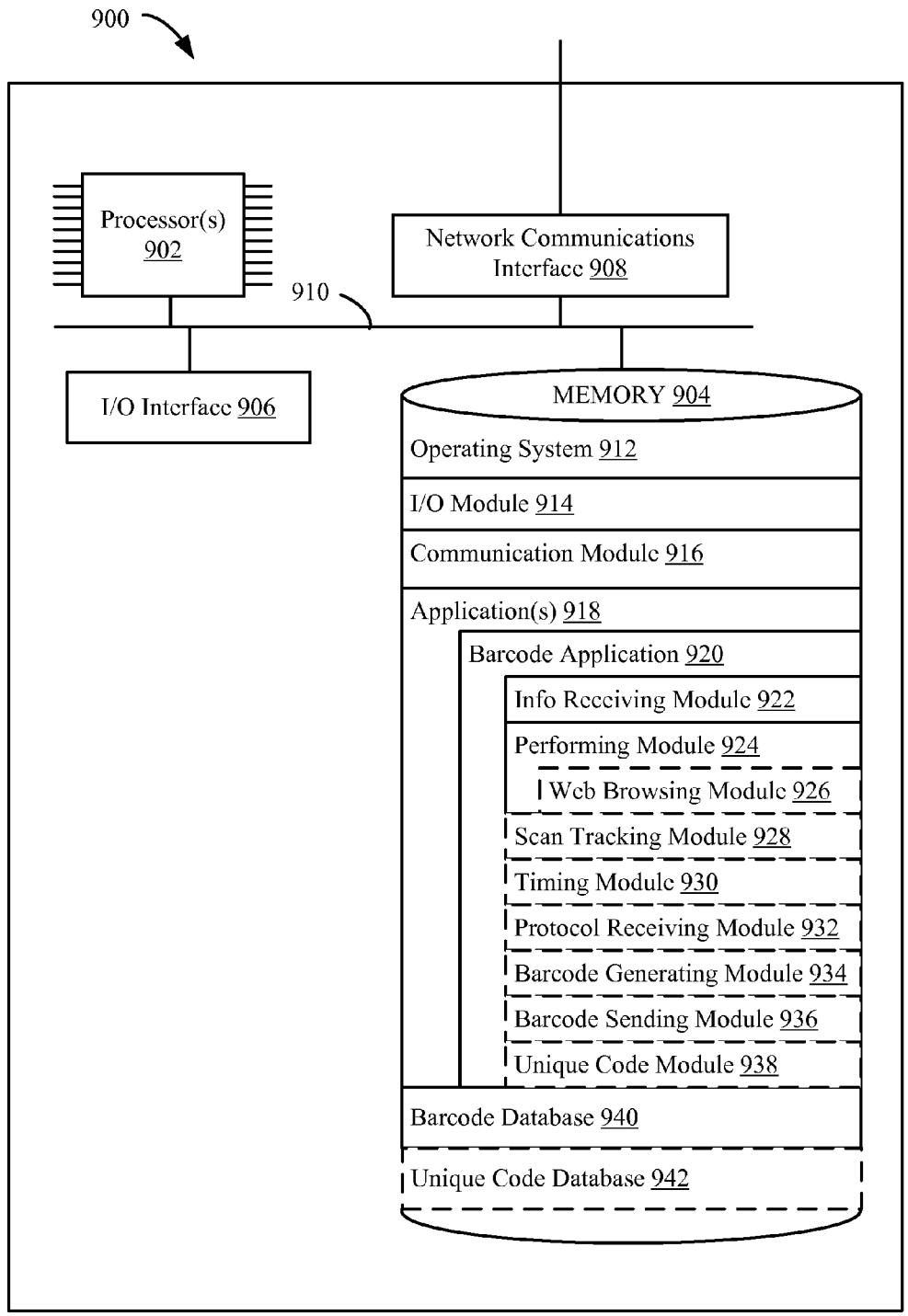
FIG. 9 is a block diagram of an electronic device in accordance with some embodiments.

FIG. 9 is a block diagram of an electronic device 900 in accordance with some embodiments. In some embodiments, the electronic device 900 corresponds to the open platform described above with respect to FIG. 3. In some embodiments, the electronic device 900 corresponds to the application backend described above with respect to FIG. 3. In some embodiments, the electronic device 900 corresponds to a combination of the open platform and the application backend described above with respect to FIG. 3.

As shown in FIG. 9, the device 900 includes one or more processing units (also called herein "processors") 902, memory 904, an input/output (I/O) interface 906, and a network communications interface 908. These components communicate with one another over one or more communication buses or signal lines 910. In some embodiments, the memory 904, or the computer readable storage media of memory 904, stores programs, modules, instructions, and data structures including all or a subset of: an operating system 912, an I/O module 914, a communication module 916, and one or more applications 918. The one or more processors 902 are coupled to the memory 904 and operable to execute these programs, modules, and instructions, and reads/writes from/to the data structures.

In some embodiments, the processing units 902 include one or more microprocessors, such as a single core or multi-core microprocessor. In some embodiments, the processing units 902 include one or more general purpose processors. In some embodiments, the processing units 902 include one or more special purpose processors.

In some embodiments, the memory 904 includes high-speed random access memory, such as DRAM, SRAM, DDR RAM or other random access solid state memory devices. In some embodiments the memory 904 includes non-volatile memory, such as one or more magnetic disk storage devices, optical disk storage devices, flash memory devices, or other non-volatile solid state storage devices. In some embodiments, the memory 904 includes one or more storage devices remotely located from the processing units 902. The memory 904, or alternately the non-volatile memory device(s) within the memory 904, comprises a computer readable storage medium. In some embodiments, the memory 904 comprises a non-transitory computer readable storage medium.

In some embodiments, the I/O interface 906 couples one or more input/output devices, such as one or more displays, keyboards, touch-sensitive surfaces (such as a track pad or a touch-sensitive surface of the touch-sensitive display), speakers, and microphones, to the I/O module 914 of the device 900. The I/O interface 906, in conjunction with the I/O module 914, receive user inputs (e.g., voice input, keyboard inputs, etc.) and process them accordingly. The I/O interface 906 and the I/O module 914 also present outputs (e.g., sounds, images, text, etc.) to the user according to various program instructions implemented on the device 900.

In some embodiments, the network communications interface 908 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 908 enables communication between the device 900 with networks, such as the Internet, an intranet and/or a wireless network, such as a cellular telephone network, a wireless local area network (LAN) and/or a metropolitan area network (MAN), and other devices. The communications module 916 facilitates communications between the device 900 and other devices (e.g., the server described above in connection with FIG. 1) over the network communications interface 908.

In some embodiments, the operating system 912 (e.g., Darwin, RTXC, LINUX, UNIX, OS X, WINDOWS, iOS, Android, or an embedded operating system such as VxWorks) includes various software components and/or drivers for controlling and managing general system tasks (e.g., memory management, storage device control, power management, etc.) and facilitates communications between various hardware, firmware, and software components.

It should be noted that the device 900 is only one example, and that the device 900 may have more or fewer components than shown, may combine two or more components, or may have a different configuration or arrangement of the components. The various components shown in FIG. 9 may be implemented in hardware, software, firmware, including one or more signal processing and/or application specific integrated circuits, or a combination of thereof.

In FIG. 9, the barcode application 920 stored in the memory 904 include the following modules or a subset or a superset thereof:

Information Receiving Module 922 configured for receiving barcode information (e.g., from third-party terminals and/or user terminals);

Performing Module 924 configured for performing an action in accordance with an action instruction and location information;

Scan Tracking Module 928 configured for tracking a number of barcode scans (e.g., clickthroughs);

Timing Module 930 configured for determining whether an expiration time has passed;

Protocol Receiving Module 932 configured for receiving protocol data from third-party terminals;

Barcode Generating Module 934 configured for generating one or more barcodes;

Barcode Sending Module 936 configured for sending one or more barcodes; and

Unique Code Module 938 configured for sending a unique code to a third-party terminal and receiving the unique code back from the third-party terminal.

In some embodiments, the memory 904 stores barcode database 940. In some embodiments, the barcode database 940 includes information identifying one or more barcodes generated by the electronic device, information stored in the one or more barcodes generated by the electronic device, and/or protocol data received from third-party terminals.

In some embodiments, Performing Module 924 includes Web Browsing Module 926 configured for presenting webpage information to one or more user terminals.

In some embodiments, the memory 904 also stores unique code database 942, which stores unique codes sent by the electronic device to third-party terminals. In some embodiments, each unique code corresponds to a respective set of protocol data. In some embodiments, each unique code corresponds to a respective third-party terminal.

Details of the structures, functions, and interactions of these modules are provided with respect to FIGS. 1-8 and 10 and accompanying descriptions.

FIG. 10 illustrates a flow chart of an exemplary method for processing barcode information in accordance with some embodiments.

In some embodiments, the method 1000 is performed by an electronic device (e.g., the open platform in FIG. 3) with memory and one or more processors.

In some embodiments, the device, prior to receiving the barcode information, receives (1002) protocol data from a third-party terminal. For example, in some embodiments, the third-party terminal submits the protocol data to the device. The protocol data includes (1) the information identifying the action instruction (e.g., an instruction that is configured to be performed in response to receiving barcode information) and (2) the information identifying a first location of a corresponding barcode (e.g., the location where the corresponding barcode is to be placed, such as an airport, a train station, a television channel, a magazine, a newspaper, a webpage, etc.). The device generates a barcode that stores (1) the information identifying the action instruction and (2) the information identifying the first location. In some embodiments, the barcode is one dimensional barcode or two dimensional barcode (e.g., a matrix barcode, such as a Quick Response Code (also called herein QR code)). The device sends the barcode to the third-party terminal. In some embodiments, the third-party terminal provides the barcode to one or more computer systems for further distribution (e.g., to a publishing computer system for inclusion into a bill board, a magazine, or a newspaper; to a television computer system for inclusion into a television program or a television advertisement; to an online computer system for inclusion in a webpage or an online advertisement, etc.).

In some embodiments, the protocol data includes additional information (e.g., a user type, a user source, etc.) and the barcode stores the additional information. For example, in some embodiments, the protocol data includes a time stamp and the barcode stores the time stamp.

In some embodiments, the device, prior to generating the barcode, sends (1004) a unique code to the third-party terminal; and receives the unique code from the third-party terminal. In some embodiments, sending and receiving the unique code are used as a way to authenticate the third-party terminal. For example, in some cases, an unauthorized terminal may pretend to be an authorized third-party terminal. By sending a unique code to the authorized third-party terminal (e.g., via secure communication methods) without sending the unique code to the unauthorized terminal, the unauthorized terminal cannot return the unique code, thereby preventing the unauthorized terminal from receiving the barcode. In some embodiments, the unique code is maintained in a unique code database (e.g., unique code database 942 in FIG. 9) at least until after the third-party terminal is authenticated.

In some embodiments, the protocol data includes (1006) information identifying a second location. For example, the third-party terminal may request respective barcodes for multiple locations. The device generates a second barcode that stores (1) the information identifying action instruction and (2) the information identifying the second location. The second barcode is distinct from the barcode that stores the information identifying the first location. The device sends the second barcode to the third-party terminal. In some embodiments, the second barcode is distributed to a location distinct from the first location (e.g., the barcode is included in a sign posted at an airport and the second barcode is included in a sign posted at a train station).

The device receives (1008) barcode information. For example, a user terminal that scans a barcode sends information stored in the barcode to the device. The barcode information includes (1) information identifying an action instruction and (2) information identifying the first location of the corresponding barcode (e.g., the location where the barcode is posted).

In some embodiments, the barcode information includes (1010) information identifying an expiration time. The device, prior to performing the action in accordance with the action instruction and the first location of the corresponding barcode, determines that the expiration time has not passed. For example, a barcode included in a sign posted at an airport may have an expiration time that corresponds to a posting period of the sign at the airport, thereby preventing use or abuse of the barcode (e.g., discounts offered through the use of the barcode) after the expiration time. In some embodiments, the expiration time indicates a day or time of expiration. In some embodiments, the barcode includes information identifying a lifetime of the barcode (in days, hours, minutes, etc.) and a time stamp instead of, or in addition to, the expiration time. In some embodiments, the lifetime and the time stamp are used in conjunction to determine the expiration time.

The device performs (1012) an action in accordance with the action instruction and the first location of the corresponding barcode. In some embodiments, the device performs a first action when the first location corresponds to a first location type and performs a second action when the first location corresponds to a second location type. For example, in some embodiments, the device displays information corresponding to an airport when the first location corresponds to an airport, and the device displays information corresponding to a train station when the first location corresponds to a train station (e.g., a barcode included in an advertisement by a fast-food restaurant chain shown at an airport initiates displaying a fast-food restaurant of the fast-food restaurant chain located within the airport on a map along with a corresponding discount coupon, and a barcode included in a similar advertisement by the same fast-food restaurant chain shown at a train station initiates displaying a fast-food restaurant of the same fast-food restaurant chain located within the train station on a map).

In some embodiments, performing the action in accordance with the action instruction and the first location of the corresponding barcode includes (1014) presenting webpage information that corresponds to the action instruction and the first location. For example, in some embodiments, the action instruction includes a universal resource locator, which is used to access a corresponding webpage.

In some embodiments, the device stores (1016) a number of barcode scans from the first location based on a number of receiving the barcode information that includes information identifying the first location. In some embodiments, the device tracks a number of barcode scans based on respective locations of barcodes. For example, the device may track a number of barcode scans for an advertisement by a fast-food restaurant chain in an airport separately from a number of barcode scans for an advertisement by the same fast-food restaurant chain in a train station.

While particular embodiments are described above, it will be understood that it is not intended to limit the scope of claims to these particular embodiments. Rather, the scope of claims includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the embodiments herein is for the purpose of describing particular embodiments only and is not intended to be limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best utilize the principles and various embodiments with various modifications as are suited to the particular use contemplated.

What is claimed is:

1. A method for processing barcode information, performed by an electronic device with memory and one or more processors, the method comprising:
   receiving, from a third-party terminal, protocol data for a barcode to be generated, the protocol data including (1) information identifying an action instruction, (2) information identifying a first location where the barcode is to be posted, and (3) information identifying an expiration time of the barcode;
   generating the barcode, wherein the barcode stores (1) the information identifying the action instruction, (2) the information identifying the first location, and (3) the information identifying the expiration time of the barcode;
   sending the barcode to the third-party terminal; and
   subsequent to sending the barcode to the third-party terminal:
      receiving barcode information sent from a user terminal and obtained by the user terminal scanning the barcode from the first location, the barcode information including (1) the information identifying the action instruction, (2) the information identifying the first location, and (3) the information identifying the expiration time of the barcode;
      determining whether the expiration time has passed;
      in accordance with a determination that the expiration time has not passed, performing an action in accordance with the action instruction and the first location of the barcode, including presenting, to the user terminal, information that corresponds to the action instruction in accordance with a location type of the first location; and in accordance with a determination that the expiration time has passed, forgoing the performance of the action in accordance with the action instruction and the first location of the barcode.

2. The method of claim 1, further comprising:

storing a number of times the barcode has been scanned from the first location, wherein the number of times the barcode has been scanned from the first location is determined based on a number of times the barcode information that includes the information identifying the first location has been received.

3. The method of claim 1, further comprising:

prior to generating the barcode:
sending a unique code to the third-party terminal; and
receiving the unique code from the third-party terminal.

4. The method of claim 1, wherein the protocol data includes information identifying a second location, the method comprising:

generating a second barcode that stores (1) the information identifying the action instruction and (2) the information identifying the second location; and
sending the second barcode to the third-party terminal.

5. The method of claim 1, wherein performing the action in accordance with the action instruction and the first location of the barcode includes presenting webpage information that corresponds to the action instruction and the first location.

6. The method of claim 1, wherein the information identifying the expiration time includes a length of time that indicates a lifetime of the barcode.

7. The method of claim 1, further comprising:

receiving second barcode information sent from the user terminal and obtained by the user terminal scanning a second barcode from a second location, the second barcode information including (1) information identifying a second action instruction that is distinct from the action instruction, (2) information identifying the second location of the second barcode, and (3) information identifying an expiration time of the second barcode;
determining whether the expiration time of the second barcode has passed;
in accordance with a determination that the expiration time of the second barcode has not passed, performing an action in accordance with the second action instruction and the second location of the second barcode; and
in accordance with a determination that the expiration time of the second barcode has passed, forgoing the performance of the action in accordance with the second action instruction and the second location of the second barcode.

8. An electronic device for processing barcode information, comprising:

one or more processors; and
memory storing one or more programs for execution by the one or more processors, the one or more programs including instructions for:
receiving, from a third-party terminal, protocol data for a barcode to be generated, the protocol data including (1) information identifying an action instruction, (2) information identifying a first location where the barcode is to be posted, and (3) information identifying an expiration time of the barcode;
generating the barcode, wherein the barcode stores (1) the information identifying the action instruction, (2) the information identifying the first location, and (3) the information identifying the expiration time of the barcode;
sending the barcode to the third-party terminal; and
subsequent to sending the barcode to the third-party terminal:
receiving barcode information sent from a user terminal and obtained by the user terminal scanning the barcode from the first location, the barcode information including (1) the information identifying the action instruction, (2) the information identifying the first location, and (3) the information identifying the expiration time of the barcode;
determining whether the expiration time has passed;
in accordance with a determination that the expiration time has not passed, performing an action in accordance with the action instruction and the first location of the barcode, including presenting, to the user terminal, information that corresponds to the action instruction in accordance with a location type of the first location; and
in accordance with a determination that the expiration time has passed, forgoing the performance of the action in accordance with the action instruction and the first location of the barcode.

9. The device of claim 8, wherein the one or more programs further include instructions for:

storing a number of times the barcode has been scanned from the first location, wherein the number of times the barcode has been scanned from the first location is determined based on a number of times the barcode information that includes the information identifying the first location has been received.

10. The device of claim 8, wherein the one or more programs further include instructions for:

prior to generating the barcode:
sending a unique code to the third-party terminal; and
receiving the unique code from the third-party terminal.

11. The device of claim 8, wherein the protocol data includes information identifying a second location, and the one or more programs further include instructions for:

generating a second barcode that stores (1) the information identifying the action instruction and (2) the information identifying the second location; and
sending the second barcode to the third-party terminal.

12. The device of claim 8, wherein performing the action in accordance with the action instruction and the first location of the barcode includes presenting webpage information that corresponds to the action instruction and the first location.

13. A non-transitory computer readable storage medium storing one or more programs for execution by one or more processors of a portable electronic device, the one or more programs including instructions for:

receiving, from a third-party terminal, protocol data for a barcode to be generated, the protocol data including (1) information identifying an action instruction, (2) information identifying a first location where the barcode is to be posted, and (3) information identifying an expiration time of the barcode;
generating the barcode, wherein the barcode stores (1) the information identifying the action instruction, (2) the information identifying the first location, and (3) the information identifying the expiration time of the barcode;

sending the barcode to the third-party terminal; and subsequent to sending the barcode to the third-party terminal:

receiving barcode information sent from a user terminal and obtained by the user terminal scanning the barcode from the first location, the barcode information including (1) the information identifying the action instruction, (2) the information identifying the first location, and (3) the information identifying the expiration time of the barcode;

determining whether the expiration time has passed;

in accordance with a determination that the expiration time has not passed, performing an action in accordance with the action instruction and the first location of the barcode, including presenting, to the user terminal, information that corresponds to the action instruction in accordance with a location type of the first location; and in accordance with a determination that the expiration time has passed, forgoing the performance of the action in accordance with the action instruction and the first location of the barcode.

14. The computer readable storage medium of claim 13, wherein the one or more programs further include instructions for:

storing a number of times the barcode has been scanned from the first location, wherein the number of times the barcode has been scanned from the first location is determined based on a number of times the barcode information that includes the information identifying the first location has been received.

15. The computer readable storage medium of claim 13, wherein the one or more programs further include instructions for:

prior to generating the barcode:
sending a unique code to the third-party terminal; and
receiving the unique code from the third-party terminal.

16. The computer readable storage medium of claim 13, wherein the protocol data includes information identifying a second location, and the one or more programs further include instructions for:

generating a second barcode that stores (1) the information identifying the action instruction and (2) the information identifying the second location; and sending the second barcode to the third-party terminal.

\* \* \* \* \*